(12) United States Patent
Yamao

(10) Patent No.: US 11,506,755 B2
(45) Date of Patent: Nov. 22, 2022

(54) RECORDING MEDIUM RECORDING INFORMATION PROCESSING PROGRAM, INFORMATION PROCESSING APPARATUS, AND INFORMATION PROCESSING METHOD

(71) Applicant: FUJITSU LIMITED, Kawasaki (JP)

(72) Inventor: Sosuke Yamao, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 761 days.

(21) Appl. No.: 16/450,964

(22) Filed: Jun. 24, 2019

(65) Prior Publication Data

US 2019/0310348 A1 Oct. 10, 2019

Related U.S. Application Data

(63) Continuation of application No. PCT/JP2017/001258, filed on Jan. 16, 2017.

(51) Int. Cl.
*G01S 7/48* (2006.01)
*G06K 9/62* (2022.01)
(Continued)

(52) U.S. Cl.
CPC ............ *G01S 7/4802* (2013.01); *G01C 15/00* (2013.01); *G01C 21/30* (2013.01); *G01S 7/4808* (2013.01);
(Continued)

(58) Field of Classification Search
CPC ... G01S 7/4802; G01S 7/4808; G06V 10/758; G01C 15/00; G01C 21/30; G05D 1/02; G06K 9/6215
(Continued)

(56) References Cited

U.S. PATENT DOCUMENTS 9,053,547 B2 * 6/2015 Kitamura .............. G01B 11/24
2015/0166060 A1 * 6/2015 Smith .................... G01S 15/88
701/23
(Continued)

FOREIGN PATENT DOCUMENTS

JP 2007-322351 12/2007
JP 2008-076252 4/2008
(Continued)

OTHER PUBLICATIONS

Yoshida Kohei et al., "Simultaneous Localization and Mapping for Multiple Mobile Robots with LRF", The Japan Society of Mechanical Engineers, No. 095-1, pp. 515-516, Feb. 26, 2009 (9 pages), with English translation. Cited in ISR for PCT/JP2017/001258.
(Continued)

*Primary Examiner* — Aditya S Bhat
(74) *Attorney, Agent, or Firm* — Fujitsu Patent Center

(57) ABSTRACT

A recording medium records a program that causes a computer to execute processing of: obtaining pieces of three-dimensional point data observed a mobile body; calculating a feature amount according to a distance between a position of the mobile body and each of three-dimensional points indicated by the pieces of three-dimensional point data; and specifying a reference point that corresponds to the position of the mobile body from among reference points in a mobile space of the mobile body which are registered in a database that registers a combinations each of the respective reference points and the feature amounts according to the distance between the position of the respective reference points and each of three-dimensional points indicated by a pieces of three-dimensional point data observed from the position of the respective reference points, based on the calculated feature amount and the database.

15 Claims, 16 Drawing Sheets

(51) Int. Cl.
  *G01C 21/30* (2006.01)
  *G01C 15/00* (2006.01)
  *G05D 1/02* (2020.01)
  *G06V 10/75* (2022.01)
(52) U.S. Cl.
  CPC ............ *G05D 1/02* (2013.01); *G06K 9/6215* (2013.01); *G06V 10/758* (2022.01)
(58) Field of Classification Search
  USPC ....................................................... 702/159
  See application file for complete search history.

(56) References Cited

U.S. PATENT DOCUMENTS

2015/0362921 A1\* 12/2015 Hanaoka .............. G05D 1/0088
  702/159

2016/0144505 A1\* 5/2016 Fong ...................... B25J 9/1697
  700/250

FOREIGN PATENT DOCUMENTS

| JP | 2008-309671 | 12/2008 |
|---|---|---|
| JP | 2009-128192 | 6/2009 |
| JP | 2012-026974 | 2/2012 |
| JP | 2014-85166 | 5/2014 |
| JP | 2016-170011 | 9/2016 |
| WO | 2014/155715 | 10/2014 |

OTHER PUBLICATIONS

International Search Report, mailed in connection with PCT/JP2017/001258 dated Apr. 4, 2017 (9 pages), with partial English translation.

\* cited by examiner

FIG. 2

| ID | THREE-DIMENSIONAL POINT DATA |
|---|---|
| 000001 | (q1,r1,s1),(q2,r2,s2),⋯(qx,rx,sx) |
| 000002 | (d1,e1,f1),(d2,e2,f2),⋯(dy,ey,fy) |
| ... | ... |
| xxxxxx | (u1,v1,w1),(u2,v2,w2),⋯(uz,vz,wz) |

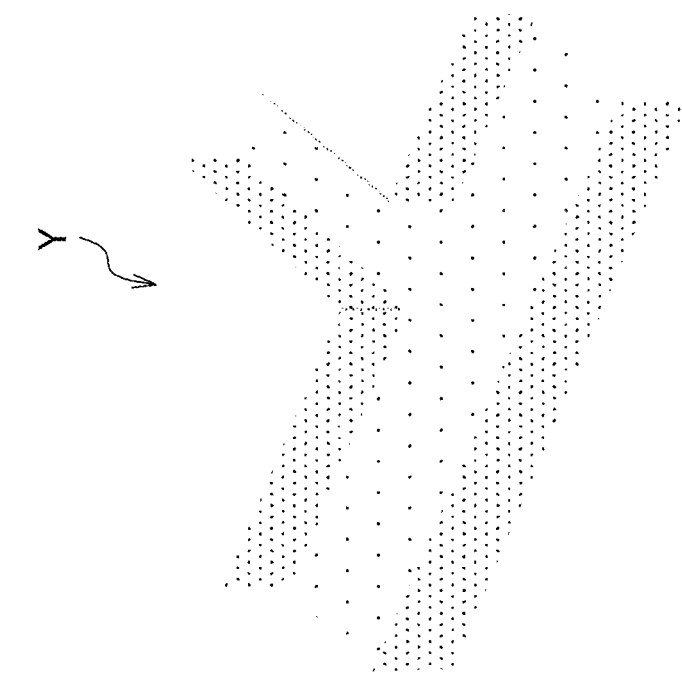
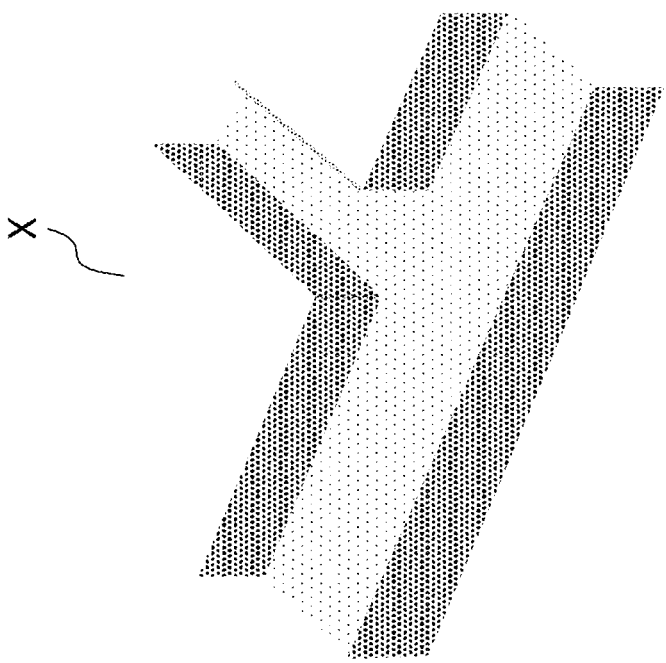
FIG. 3

FIG. 7
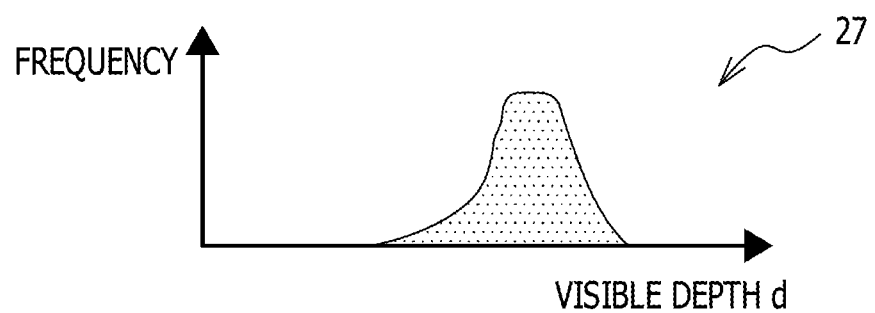
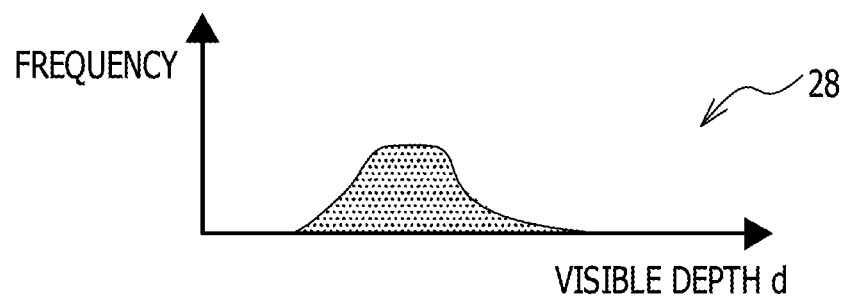

FIG. 8

| REFERENCE POINT ID | THREE-DIMENSIONAL POSITION OF REFERENCE POINT | INDEX OF FACE OF REGULAR n-HEDRON | HISTOGRAM |
|---|---|---|---|
| 000001 | (q1,r1,s1) | 1 | (0.1,0.3,⋯) |
| | | ⋯ | ⋯ |
| | | n | (0.0,0.1,⋯) |
| ⋯ | ⋯ | ⋯ | ⋯ |
| | | ⋯ | ⋯ |
| | | ⋯ | ⋯ |
| 00000m | (qm,rm,sm) | 1 | (0.2,0.1,⋯) |
| | | ⋯ | ⋯ |
| | | n | (0.4,0.1,⋯) |

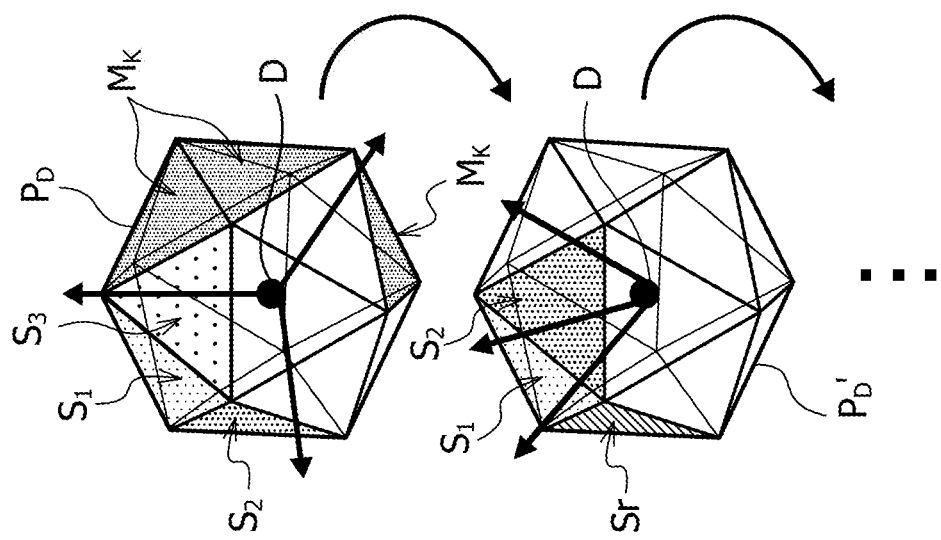
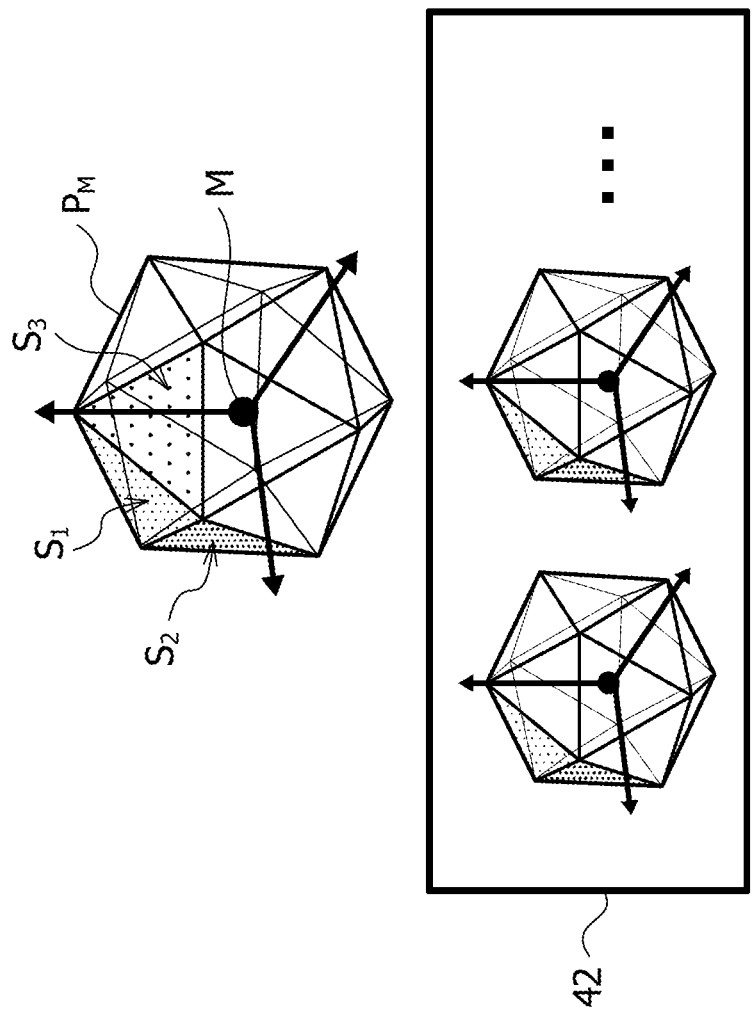
FIG. 11

RECORDING MEDIUM RECORDING INFORMATION PROCESSING PROGRAM, INFORMATION PROCESSING APPARATUS, AND INFORMATION PROCESSING METHOD

CROSS-REFERENCE TO RELATED APPLICATION

This application is a continuation application of International Application PCT/JP2017/001258 filed on Jan. 16, 2017 and designated the U.S., the entire contents of which are incorporated herein by reference.

FIELD

The embodiments relates to a recording medium recording an information processing program, an information processing apparatus and an information processing method.

BACKGROUND

A three-dimensional object verification device estimates position and orientation of an object on the basis of data obtained by a three-dimensional sensor.

Related art is disclosed in Japanese Laid-open Patent Publication No. 2007-322351, Japanese Laid-open Patent Publication No. 2008-309671, Japanese Laid-open Patent Publication No. 2012-26974, International Publication Pamphlet No. WO 2014/155715, and Japanese Laid-open Patent Publication No. 2009-128192.

SUMMARY

According to an aspect of the embodiments, a non-transitory computer-readable recording medium records an information processing program that causes a computer to execute processing of: obtaining a plurality of pieces of three-dimensional point data observed by an observation circuit mounted on a mobile body; calculating a feature amount according to a distance between a position of the mobile body and each of three-dimensional points indicated by the plurality of pieces of three-dimensional point data, based on a position of the mobile body and the plurality of pieces of three-dimensional point data; and specifying a reference point that corresponds to the position of the mobile body from among a plurality of reference points in a mobile space of the mobile body which are registered in a database that registers a plurality of combinations each of the respective reference points and the feature amounts according to the distance between the position of the respective reference points and each of three-dimensional points indicated by a plurality of pieces of three-dimensional point data observed from the position of the respective reference points, based on the calculated feature amount and the database.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a table that stores three-dimensional point data.

FIG. 3 is a view illustrating an example of a model point cloud and a data point cloud.

FIG. 7 is a view illustrating an example of a histogram calculated for each of faces of a regular n-hedron.

FIG. 8 is a diagram illustrating an example of a table that associates reference points with histograms calculated for each of faces of the reference points.

FIG. 11 is a view illustrating similarity levels between histograms calculated for each of overlapping modes between a regular n-hedron centered on the reference point and a regular n-hedron centered on the position of the mobile body.

DESCRIPTION OF EMBODIMENTS

Figure 1:
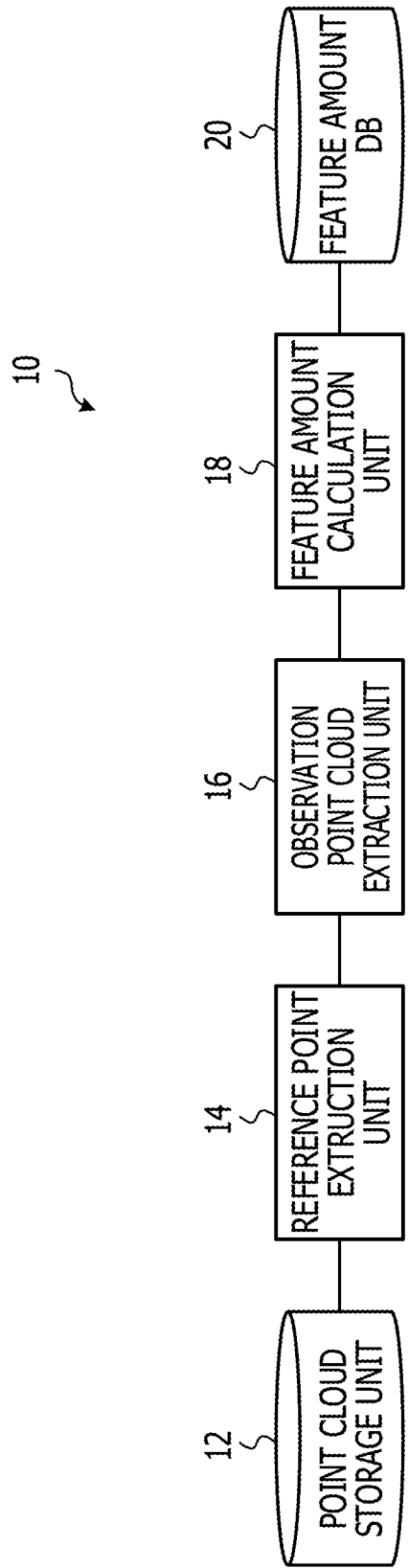
FIG. 1 is a schematic block diagram of a database generation apparatus according to the present embodiment.

For example, the three-dimensional object verification device performs two-stage position and orientation estimation using a first step of performing coarse position and orientation estimation and a second step of performing detailed position and orientation estimation based on the result of the first step.

For example, a recognition object recognition device recognizes the position and orientation of a measurement target without being influenced by a change in background information of the measurement target. This recognition object recognition device inputs coordinate values on a three-dimensional shape obtained by measurement from a new measurement position into a computer, builds an environmental model that stores each of voxel positions, and sets a representative point and its error distribution within the voxels that corresponds to the coordinate values and then, stores the setting. Subsequently, the recognition object recognition device performs alignment so as to minimize an evaluation value regarding the distance between adjacent error distributions, and identifies a self position from the amount of rotation and the amount of translation. Subsequently, the recognition object recognition device rotates and translates the measurement target represented by model data with respect to the measurement data and the error distribution obtained by integration, and performs alignment so as to minimize the evaluation value regarding the distance between elements forming the measurement data and the model data.

For example, a three-dimensional object recognition device is capable of improving processing speed for recognizing a recognition target. The three-dimensional object recognition device divides a space having in its center a three-dimensional model as a recognition target into a plurality of voxels, and controls to store, in each of the voxels, a distance field that records a distance to the nearest point of the three-dimensional model surface and ID representing the nearest point. The three-dimensional object recognition device presumes the position and orientation of a three-dimensional sensor, and transforms a point cloud measured by the three-dimensional sensor into each of measurement points on a model coordinate system set in the three-dimensional model, and then puts the measurement points into a voxel of each of the corresponding distance fields, thereby obtaining the distance to the nearest point.

For example, an object recognition device automatically extracts a point cloud corresponding to a target object from measured point cloud data. The object recognition device estimates shape attributes determined from relative coordinate information of neighboring points with respect to each of points of the measurement point cloud and the model point cloud. Subsequently, the object recognition device performs matching processing of each of shape attributes in the measurement point cloud and the model point cloud having the same shape attribute, and obtains presence information of the model point cloud in the measurement point cloud on the basis of the matching level of the shape attributes.

For example, an object recognition device recognizes a three-dimensional position and orientation of a target object using distance data obtained from a distance sensor. This object recognition device reads three-dimensional shape data including three-dimensional positions of the vertices and information indicating the surface of an object by connecting the vertices, and then creates a feature amount representing a local surface shape of the object with respect to the vertices of the model. Subsequently, the object recognition device measures an actual environment with a sensor and obtains distance data, and then, creates surface information of the object. Subsequently, the object recognition device creates a feature amount representing the local surface shape of the object with respect to the scene vertex, and calculates a similarity level between the feature amount of the scene vertex and the feature amount of the model vertex. When there is a pair having a similarity level higher than a threshold, the object recognition device determines the scene vertex and the model vertex as a corresponding point pair.

However, there is a problem that high accuracy estimation of the position of a mobile body would not be achieved in the case of estimating the position of the mobile body using three-dimensional point cloud data having different densities. For example, in a case where the density of three-dimensional point cloud data obtained from a sensor included in the mobile body is lower than the density of three-dimensional point cloud data of map data, it would be difficult to associate low-density three-dimensional point cloud data with high-density three-dimensional point cloud data.

For example, association of three-dimensional point cloud data with each other may be achieved even in a case where these are pieces of three-dimensional point cloud data having different densities.

Hereinafter, an example of an embodiment of the disclosed technology will be described in detail with reference to the drawings.

<Database Generation Apparatus>

A database generation apparatus 10 illustrated in FIG. 1 generates a database that has registered a plurality of combinations of reference points in a mobile space of a mobile body and feature amounts according to the position of the reference points, on the basis of a plurality of pieces of preliminarily obtained three-dimensional point data. As illustrated in FIG. 1, the database generation apparatus 10 includes a point cloud storage unit 12, a reference point extraction unit 14, an observation point cloud extraction unit 16, a feature amount calculation unit 18, and a feature amount database 20.

The point cloud storage unit 12 stores a plurality of pieces of preliminarily obtained three-dimensional point data. For example, as illustrated in FIG. 2, the three-dimensional point data is stored in a form of table including an ID representing identification information of three-dimensional point cloud data and including three-dimensional point data representing each of points included in the three-dimensional point cloud data, in association with each other. For example, the three-dimensional point cloud data "(q1, r1, s1), (q2, r2, s2), . . . , (qx, rx, sx)" of ID=000001 illustrated in FIG. 2 represents that the data includes each of points (q1, r1, s1), (q2, r2, s2), . . . , (qx, rx, sx). Each of "(q1, r1, s1)", "(q2, r2, s2)", . . . , "(qx, rx, sx)" also represents three-dimensional position coordinates of each of points.

The point cloud storage unit 12 stores a model point cloud which is a High-Definition Map (HD-MAP) representing a plurality of pieces of high-definition three-dimensional point data obtained by a sensor such as Light Detection and Ranging (LiDAR), for example. The model point cloud stored in the point cloud storage unit 12 is obtained by a sensor mounted on a mobile body, for example. For example, a model point cloud is obtained by the sensor mounted on the mobile body when the mobile body is traveling on a course.

FIG. 3 illustrates a model point cloud X representing an example of a plurality of pieces of three-dimensional point data stored in the point cloud storage unit 12 and a data point cloud Y representing an example of a plurality of piece of three-dimensional point data obtained by a sensor of an information processing apparatus described below.

The model point cloud X is high-definition point cloud data obtained by a sensor such as LiDAR, for example, and is used as map data. In contrast, the data point cloud Y is obtained by a sensor such as a laser range finder (LRF), for example. The data point cloud Y obtained by a sensor such as an LRF is point cloud data having lower density than the model point cloud X obtained by a sensor such as LiDAR. In a case where the model point cloud X is stored as map data and data point cloud Y is obtained by the sensor of the mobile body, there is a need to associate the model point cloud X with the data point cloud Y at the time of estimating the position of the mobile body. However, in a case where there is a density difference in three-dimensional point data between the model point cloud X of the map data and the data point cloud Y obtained by the sensor, performing association would be difficult.

For example, in alignment of three-dimensional point cloud data, a plurality of pieces of representative three-dimensional point data representing a characteristic three-dimensional shape is detected as a feature point, from among a plurality of pieces of three-dimensional point data. Next, for each of feature points, three-dimensional coordinates and normal information of three-dimensional point data present in the vicinity of the feature point are used to described a feature amount related to a three-dimensional shape (for example, curvature) in the vicinity of the feature point. However, there is a need to ensure three-dimensional point data of sufficient density to express a three-dimensional shape in the vicinity of the feature point, and thus, in a case where the three-dimensional point cloud data has low density, it would not be possible to describe a correct feature amount, leading to degradation of accuracy of alignment between the pieces of three-dimensional point cloud data.

To overcome this, the present embodiment aims to suppress the alignment accuracy degradation due to the difference in the density of the three-dimensional point cloud data, and extracts, in the model point cloud, reference points to be used for association with the position of the mobile body from each of points in a space where the mobile body is movable. Hereinafter, the reference point extraction unit 14 that extracts the reference points will be described in detail.

On the basis of the model point cloud stored in the point cloud storage unit 12, the reference point extraction unit 14 calculates the distance between a point in a space where the mobile body is movable and each of the three dimensional points indicated by the plurality of pieces of three-dimensional point data observed from the point in the space, for each of the points in the space. Subsequently, the reference point extraction unit 14 extracts a reference point in a mobile space of the mobile body from among a plurality of points in the space where the mobile body is movable, in accordance with the distance between the point and each of the three-dimensional points indicated by the plurality of pieces of three-dimensional point data, calculated for each of the points.

Figure 4:
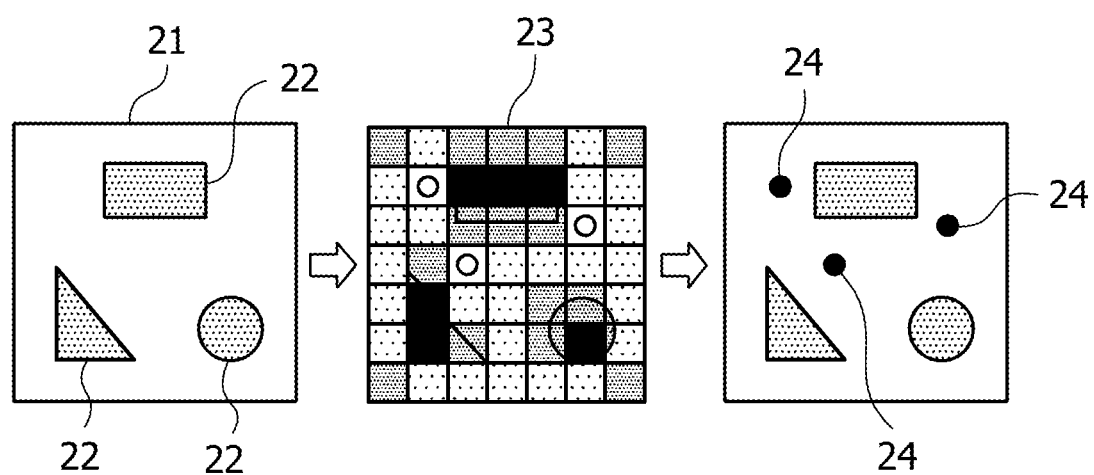
FIG. 4 is a view illustrating extraction of reference points.

FIG. 4 illustrates a view illustrating extraction of reference points. For the sake of simplicity of description, FIG. 4 illustrates the three-dimensional space as a two-dimensional space.

For example, as illustrated in FIG. 4, the reference point extraction unit 14 divides a three-dimensional space 21 including the model point cloud stored in the point cloud storage unit 12 into a predetermined number of voxels and generates a voxel grid. The model point cloud includes a plurality of pieces of three-dimensional point data indicating three-dimensional position coordinates of each of a plurality of points on the surface of the object 22 present in the three-dimensional space 21. Subsequently, as illustrated in FIG. 4, the reference point extraction unit 14 assigns a distance from the voxel to a three-dimensional point indicated by the nearest three-dimensional point data to each of voxels of the voxel grid, thereby generating a distance field (DF) 23. In generating the DF 23, the reference point extraction unit 14 can use the Fast Voxel Traversal algorithm or the like to calculate the distance from the voxel to the nearest three-dimensional point. In the DF 23 illustrated in FIG. 4, the shorter the distance from the voxel to the nearest three-dimensional point, the darker the representation of the voxel will be.

Next, for each of voxels of the DF 23, the reference point extraction unit 14 compares the value of the distance assigned to the voxel with the value of the distance assigned to the voxels around the voxel, and determines whether the distance value assigned to the voxel is a local maximum. Note that the surrounding voxel range used for determination is preliminarily set.

On the basis of the determination result of the local maximum, the reference point extraction unit 14 sets a voxel having a distance value of a predetermined threshold or more among voxels to which the distance value determined to be the local maximum is allocated, as a reference voxel. In FIG. 4, the voxels including a circle are reference voxels. Subsequently, as illustrated in FIG. 4, the reference point extraction unit 14 extracts center coordinates of the set reference voxel, as a reference point 24.

Figure 5:
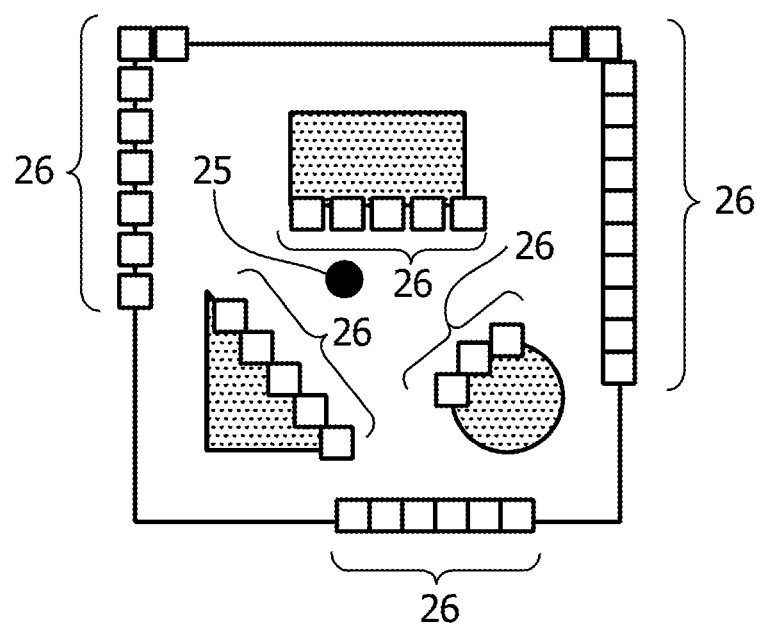
FIG. 5 is a view illustrating a visible point cloud observed from a reference point.

The observation point cloud extraction unit 16 extracts each of the voxels observed from the reference points on the basis of the model point cloud stored in the point cloud storage unit 12 for each of reference points extracted by the reference point extraction unit 14. For example, in a case where a voxel adjacent to a reference voxel is sequentially traced in a certain direction and a voxel including a three-dimensional point indicating the object 22 is reached, the voxel can be defined as a voxel observed from the reference point. Subsequently, the observation point cloud extraction unit 16 sets, for each of extracted voxels, a three-dimensional point present inside the voxel as a visible point cloud, toward each of reference points. For example, as illustrated in FIG. 5, the observation point cloud extraction unit 16 sets three-dimensional points indicated by a plurality of pieces of three-dimensional point data observable from the reference point 25, as a visible point cloud 26.

The feature amount calculation unit 18 calculates, for each of reference points extracted by the reference point extraction unit 14, a feature amount regarding the shape of the visible space observed from the position of the reference point, in accordance with the distance between the reference point and each of three-dimensional points indicated by a plurality of pieces of three-dimensional point data included in the visible point cloud. Subsequently, the feature amount calculation unit 18 registers, for each of reference points, a combination of the reference point and the feature amount calculated for the reference point, into the feature amount database 20.

Specifically, the feature amount calculation unit 18 calculates, for each reference point, a histogram for each of observation directions from the reference point as a feature amount. The histogram for the observation direction represents frequency of the three-dimensional points present in the observation direction that corresponds to each of distances between the position of the reference point and the three-dimensional points indicated by the three-dimensional point data.

The feature amounts of the present embodiment will be described in detail below.

Figure 6:
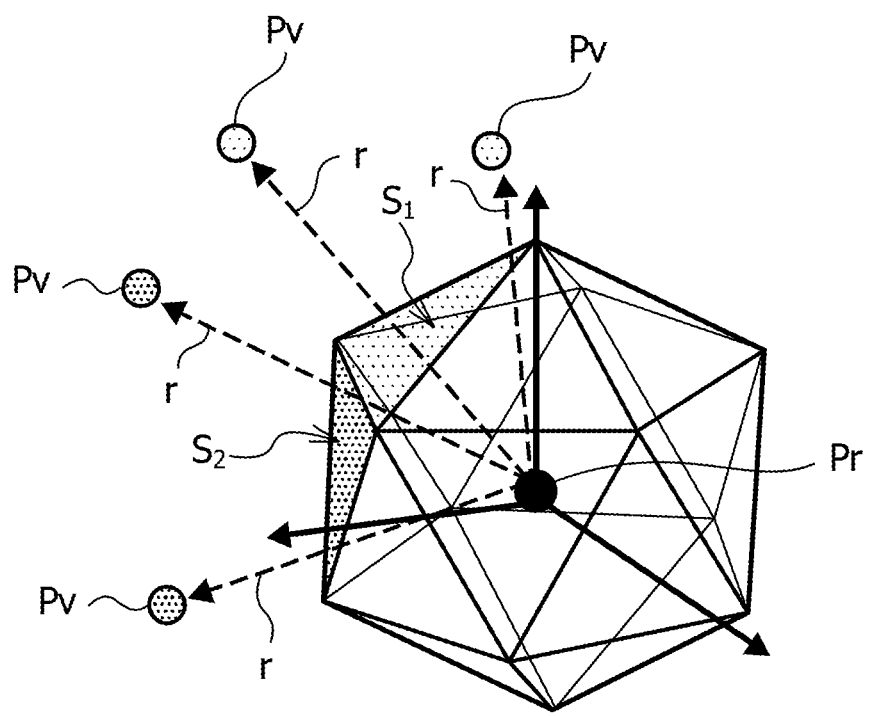
FIG. 6 is a view illustrating a histogram calculated for each of faces of a regular n-hedron formed centered on a reference point.

A feature amount of a specific reference point $P_r$ as illustrated in FIG. 6 will be described. First, as illustrated in FIG. 6, the feature amount calculation unit 18 sets a regular n-hedron centered on the reference point $P_r$. Subsequently, the feature amount calculation unit 18 sets the coordinates of the reference point $P_r$ and the regular n-hedron such that the corresponding axes of the xyz coordinate system of the visible point cloud and the coordinate system of the reference point $P_r$ and the regular n-hedron become parallel to each other.

Next, as illustrated in FIG. 6, the feature amount calculation unit 18 assigns index i to each of faces of the regular n-hedron in a predetermined order, and defines the observation direction that corresponds to each of faces $S_i$ (i=1, . . . , n) of the regular n-hedron.

Subsequently, the feature amount calculation unit 18 calculates, as a feature amount, a histogram of three-dimensional point data of a visible point cloud present in the observation direction that corresponds to each of the faces $S_i$ of the regular n-hedron from the reference point $P_r$. For example, as illustrated in FIG. 6, the feature amount calculation unit 18 votes for a bin of the distance that corresponds to a visible depth d representing a distance to a visible point $P_v$ representing three-dimensional point data on the histogram of the face $S_i$ intersecting a line-of-sight r from the reference point $P_r$ to the visible point $P_v$. The visible depth d is calculated by the following Formula (1).

$$d=|P_r-P_v|_2 \quad (1)$$

For example, as illustrated in FIG. 7, the feature amount calculation unit 18 generates a histogram of each of faces of a regular n-hedron, as a feature amount. For example, the histogram 27 illustrated in FIG. 7 represents the histogram calculated for the face $S_i$ of the regular n-hedron, while the histogram 28 represents the histogram calculated for a face $S_2$ of the regular n-hedron. The horizontal axis of the histogram represents the visible depth d, and the vertical axis represents the frequency. Furthermore, the feature amount calculation unit 18 normalizes the histogram of each of the faces so that the sum of each of bins of the histogram is 1.

Subsequently, for each of reference points, the feature amount calculation unit 18 registers, in the feature amount database 20, a combination of the reference point and the histogram calculated for each of the faces of the regular n-hedron centered on the position of the reference point.

The feature amount database 20 registers, for each of the reference points, combinations of reference points and histograms of each of the faces of the regular n-hedron calculated for the reference points, which have been obtained by the feature amount calculation unit 18. The combinations of the reference points and the histograms calculated for each of faces of the regular n-hedron centered on the position of the reference point are stored in the form of a table as illustrated in FIG. 8, for example. In the example illustrated in FIG. 8, a reference point ID representing identification information for identifying a reference point, a three-dimensional position of the reference point, and an index representing identification information of a face of a regular n-hedron set at the reference point, and a histogram are stored in association with each other. For example, a reference point ID "000001" is associated with the three-dimensional position (q1, r1, s1) of the reference point and associated with indexes 1, . . . , n representing each of faces of the regular n-hedron. Subsequently, a vector (0.1, 0.3, . . . ) representing a histogram is associated with an index "1" representing a face of a regular n-hedron of a reference point ID "000001".

<Information Processing Apparatus>

Figure 9:
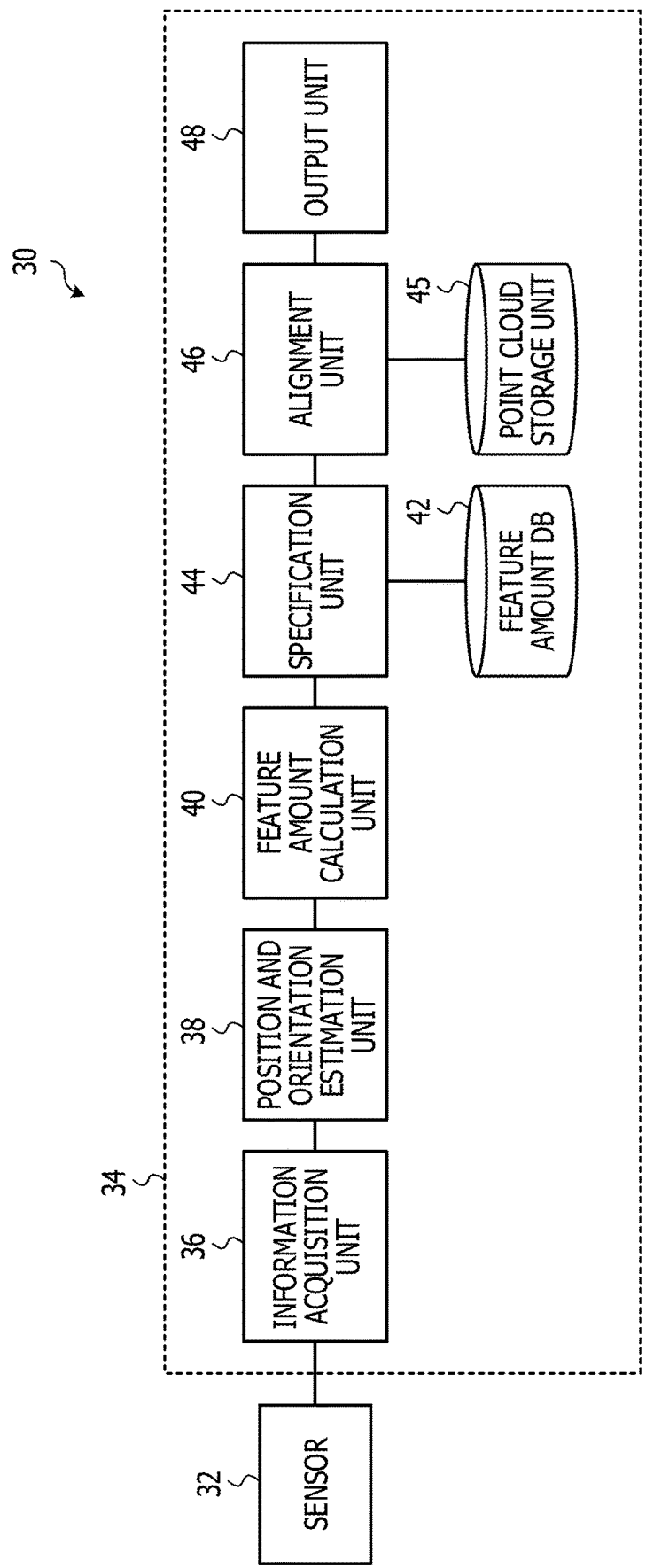
FIG. 9 is a schematic block diagram of an information processing apparatus according to the present embodiment.

The information processing apparatus 30 includes a sensor 32 and a control unit 34, as illustrated in FIG. 9. The sensor 32 is an example of an observation unit of the disclosed technology. The information processing apparatus 30 is mounted on a mobile body.

The sensor 32 is mounted on a mobile body and sequentially observes a plurality of pieces of three-dimensional point data indicating the three-dimensional position of each of points on a surface of an object around the mobile body. The sensor 32 is implemented by an LRF capable of detecting three-dimensional point data, for example. Examples of a mobile body include an automobile and a robot.

The control unit 34 associates the reference point stored in the feature amount database and the position of the mobile body on the basis of the plurality of pieces of three-dimensional point data observed by the sensor 32 and the feature amount database generated by the database generation apparatus 10. As illustrated in FIG. 9, the control unit 34 includes an information acquisition unit 36, a position and orientation estimation unit 38, a feature amount calculation unit 40, a feature amount database 42, a specification unit 44, a point cloud storage unit 45, an alignment unit 46, and an output unit 48. The information acquisition unit 36 is an example of an acquisition unit of the disclosed technology.

The information acquisition unit 36 sequentially obtains a plurality of pieces of three-dimensional point data observed by the sensor 32, as a data point cloud.

The position and orientation estimation unit 38 estimates the position of the mobile body and the orientation of the mobile body on the basis of the data point cloud obtained by the information acquisition unit 36. For example, the position and orientation estimation unit 38 estimates the position of the mobile body and the orientation of the mobile body using Simultaneous Localization and Mapping (SLAM) on the basis of the data point cloud obtained by the information acquisition unit 36.

The feature amount calculation unit 40 calculates the feature amount regarding the shape of the visible space observed from the position of the mobile body on the basis of the position of the mobile body estimated by the position and orientation estimation unit 38 and the data point cloud obtained by the information acquisition unit 36. The feature amount calculation unit 40 calculates a feature amount by the processing similar to the processing performed by the feature amount calculation unit 18 of the database generation apparatus 10. Specifically, the feature amount calculation unit 40 calculates a histogram as an example of feature amount regarding the shape of the visible space corresponding to the position of the mobile body and the distance from the position of the mobile body to each of three-dimensional points indicated by the plurality of pieces of three-dimensional point data observed by the sensor 32.

Figure 10:
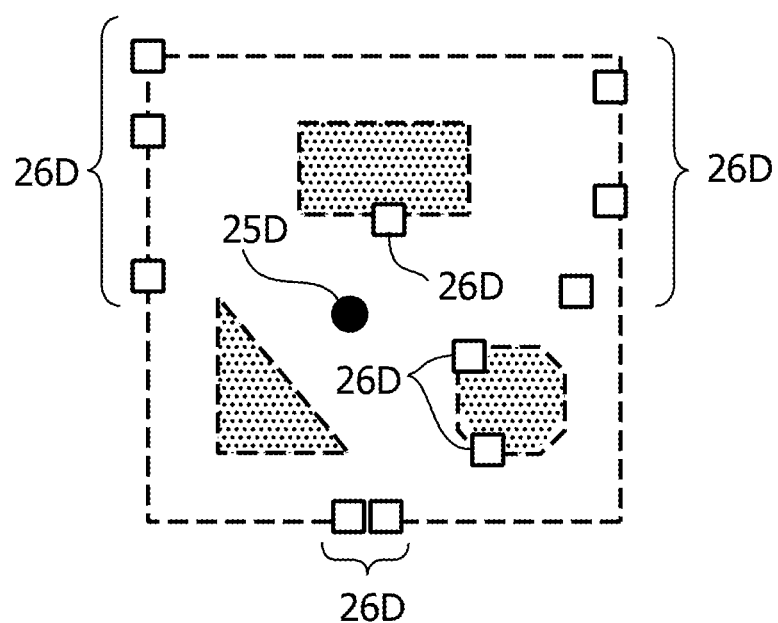
FIG. 10 is a view illustrating an example of a visible point cloud observed from the position of a mobile body.

More specifically, similarly to the feature amount calculation unit 18 of the database generation apparatus 10, the feature amount calculation unit 40 first sets a regular n-hedron centered on the position of the mobile body estimated by the position and orientation estimation unit 38. Next, the feature amount calculation unit 40 assigns an index i to each of faces of the regular n-hedron in a predetermined order, and sets a visible point cloud present in an observation direction that corresponds to each of the faces $S_i$ of the regular n-hedron from the position of the mobile body. In addition, the feature amount calculation unit 40 calculates, for each of the faces $S_i$, a histogram of three-dimensional point data of visible point clouds present in the observation direction that corresponds to the face $S_i$ of the regular n-hedron, as a feature amount. Subsequently, the feature amount calculation unit 18 normalizes each of the histograms calculated for each of the faces of the regular n-hedron such that the sum of each of bins of the histogram is 1. Note that, a visible point cloud 26D as illustrated in FIG. 10 is set by the feature amount calculation unit 40, for example. As illustrated in FIG. 10, the visible point cloud 26D observable from a position 25D of the mobile body is a point cloud having low density than the case of the visible point cloud 26 illustrated in FIG. 5.

In the present embodiment, the histogram calculated for each of faces of the regular n-hedron represents the shape of the visible space observed from the position of the reference point or the position of the mobile body. For example, a histogram calculated based on the visible point cloud 26 observed from the reference point 25 in FIG. 5 is similar to a histogram calculated based on the visible point cloud 26D observed from the position 25D of the mobile body in FIG. 10 described above. Therefore, it is possible to associate the position of the mobile body with the reference point even in a case where the three-dimensional point clouds have different densities.

The feature amount database 42 stores the same information as the information stored in the feature amount database 20 preliminarily generated by the database generation apparatus 10. Specifically, a combination of the reference point and the histogram calculated for each of faces of a regular n-hedron centered on the position of the reference point for each of the reference points, preliminarily generated by the database generation apparatus 10 is registered. In the histogram of each of faces of a regular n-hedron centered on the position of the reference point, the face in which all the bin elements of the histogram are 0 is defined as unobserved face and thus, a mask will be set for this so as not to allow this face to be used for calculation of the similarity level.

The specification unit 44 specifies the reference point that corresponds to the position of the mobile body from among the plurality of reference points registered in the feature amount database 42 on the basis of the histogram of each of faces of the regular n-hedron centered on the position of the mobile body, calculated by the feature amount calculation unit 40.

The following will describe association of the histogram of each of faces of the regular n-hedron centered on the position of the mobile body calculated by the feature amount calculation unit 40 with the histogram of each of faces of the regular n-hedron centered on each of reference points registered in the feature amount database 42.

Specifically, the specification unit 44 calculates, for each of reference points, the similarity level between the histograms of each of faces with respect to each of overlapping modes between the regular n-hedron centered on the position of the mobile body, and the regular n-hedron centered on the position of the reference point, obtained by rotating the regular n-hedron centered on the position of the mobile body. Subsequently, the specification unit 44 specifies the reference point that corresponds to the position of the mobile body on the basis of the greatest sum of the similarity levels from among the sums of the similarities between the histograms of each of the faces, calculated for each of combinations of the reference points and the overlapping modes. In the histogram of each of faces that correspond to the position of the mobile body, the specification unit 44 defines the face in which all the bin elements of the histogram are 0 as an unobserved face and thus, sets a mask for this face so as not to allow this face to be used for calculation of the similarity level.

FIG. 11 is a view illustrating a method of calculating the similarity level between histograms. The feature amount database 42 illustrated in FIG. 11 stores, for each reference point, a histogram calculated for each of faces of a regular n-hedron centered on the reference point.

For example, as illustrated in FIG. 11, the specification unit 44 selects one reference point M from among each of reference points registered in the feature amount database 42. Subsequently, the specification unit 44 calculates the similarity level between the histograms of each of the faces for all the overlapping mode, between a regular n-hedron $P_M$ centered on the reference point M and a regular n-hedron $P_D$ centered on a position D of the mobile body, at the time of rotation of the regular n-hedron $P_D$. The overlapping state between the regular n-hedrons means a state in which individual faces of each of the regular n-hedrons are made to fit together regardless of the index of each of faces.

For example, as illustrated in FIG. 11, the specification unit 44 calculates the similarity level of histogram of the face $S_1$ of the regular n-hedron $P_M$ centered on the reference point M and the face $S_1$ of the regular n-hedron $P_D$ centered on the position D of the mobile body. For example, a distance between vectors can be used as the similarity level between histograms. Furthermore, as illustrated in FIG. 11, the specification unit 44 calculates the similarity level of histogram of a face $S_2$ of the regular n-hedron $P_M$ centered on the reference point M and a face $S_2$ of the regular n-hedron $P_D$ centered on the position D of the mobile body. Furthermore, as illustrated in FIG. 11, the specification unit 44 calculates the similarity level of histogram of a face $S_3$ of the regular n-hedron $P_M$ centered on the reference point M and a face $S_3$ of the regular n-hedron $P_D$ centered on the position D of the mobile body. Subsequently, the specification unit 44 calculates the sum of the similarity levels between the histograms of each of the faces. In the histogram of each of faces that correspond to the position of the mobile body, the specification unit 44 sets a mask Mk for the face in which all the bin elements of the histogram are 0.

Next, as illustrated in FIG. 11, the specification unit 44 rotates the regular n-hedron $P_D$ centering on the position D of the mobile body, and calculates the similarity level between the histogram of each of faces of a regular n-hedron $P_D$' obtained as a result of rotation and the histogram of each of faces of the regular n-hedron $P_M$ centered on the selected reference point M. For example, as illustrated in FIG. 11, the specification unit 44 calculates the similarity level between the histogram of the face $S_1$ of the regular n-hedron $P_M$ centered on the reference point M and the face $S_1$ of the regular n-hedron $P_D$' obtained as a result of rotation. Furthermore, as illustrated in FIG. 11, the specification unit 44 calculates the similarity level between the histogram of the face $S_2$ of the regular n-hedron $P_M$ centered on the reference point M and the face $S_r$ of the regular n-hedron $P_D$' obtained as a result of rotation. Furthermore, as illustrated in FIG. 11, the specification unit 44 calculates the similarity level between the histogram of the face $S_3$ of the regular n-hedron $P_M$ centered on the reference point M and the face $S_2$ of the regular n-hedron $P_D$' obtained as a result of rotation. Subsequently, the specification unit 44 calculates the sum of the similarity levels between the histograms of each of the faces.

The specification unit 44 calculates the sum of the similarity levels between the histograms calculated for each of the faces with respect to all the overlapping modes, for each of the reference points registered in the feature amount database 42.

The specification unit 44 selects the greatest sum of the similarity levels from among each of the sums of the similarity levels calculated for all combinations of each of reference points and each of overlapping modes. Subsequently, in a case where the greatest sum of the similarity levels is a preliminarily set threshold or more, the specification unit 44 determines that the reference point that corresponds to the greatest sum of the similarity levels and the position of the mobile body estimated by the position and orientation estimation unit 38 correspond to each other. Furthermore, the specification unit 44 outputs the rotation of the regular n-hedron $P_D$ that corresponds to the greatest sum of the similarity levels.

The point cloud storage unit 45 stores a model point cloud that is the same information as the case of the point cloud storage unit 12 of the database generation apparatus 10.

The alignment unit 46 estimates coordinate transformation between the coordinate system of the position of the mobile body estimated by the position and orientation estimation unit 38 and the coordinate system of the model point cloud of the point cloud storage unit 45 in accordance with the reference point obtained by the specification unit 44 and the rotation of the regular n-hedron $P_D$. Relative coordinate transformation is estimated by execution of three-dimensional point alignment (identification of position and orientation of the mobile body) between the data point cloud obtained at the position of the mobile body and the model point cloud stored in the point cloud storage unit 45.

Subsequently, on the basis of the estimated coordinate transformation, the alignment unit 46 uses the Iterative Closest Point (ICP), for example, and estimates more specific coordinate transformation so as to achieve matching between the data point cloud obtained by the information acquisition unit 36 and the model point cloud of the point cloud storage unit 45.

The output unit 48 outputs information regarding the coordinate transformation estimated by the alignment unit 46, as a result.

Figure 12:
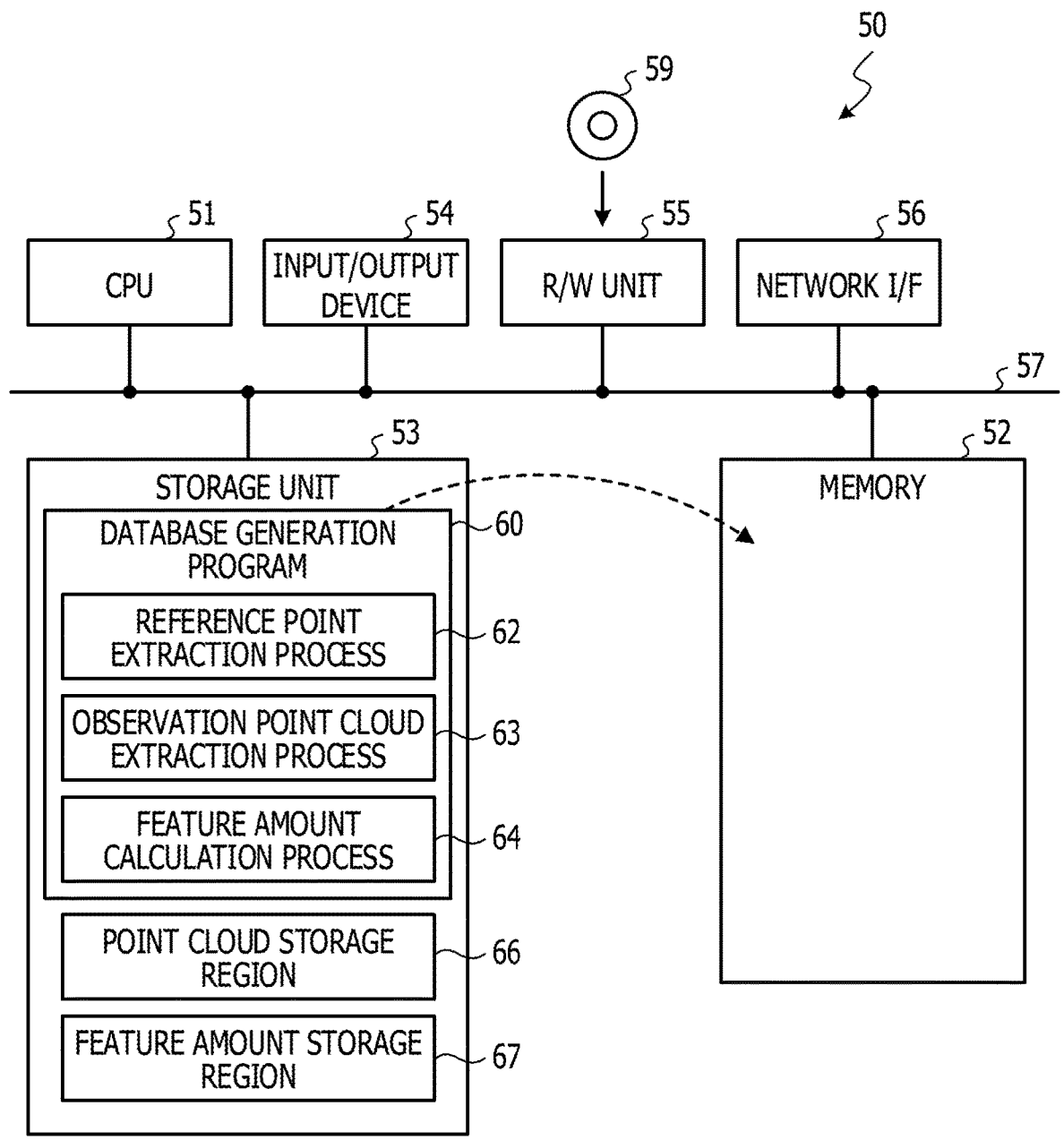
FIG. 12 is a block diagram illustrating a schematic configuration of a computer that functions as a database generation apparatus according to the present embodiment.

The database generation apparatus 10 can be implemented by a computer 50 illustrated in FIG. 12, for example. The computer 50 includes a CPU 51, a memory 52 as a temporary storage region, and a nonvolatile storage unit 53. The computer 50 further includes: an input/output interface (I/F) 54 connected with an input/output devices (not illustrated) such as a sensor, display device, and an input device; and a read/write (R/W) unit 55 that controls data reading and writing from and into the input/output interface (I/F) 54 and a recording medium 59. The computer 50 also includes a network I/F 56 connected to a network such as the Internet. The CPU 51, the memory 52, the storage unit 53, the input/output I/F 54, the R/W unit 55, and the network I/F 56 are interconnected via a bus 57.

The storage unit 53 can be implemented by a hard disk drive (HDD), a solid-state drive (SSD), a flash memory, or the like. The storage unit 53 as a storage medium stores a database generation program 60 for causing the computer 50 to function as the database generation apparatus 10. The database generation program 60 includes a reference point extraction process 62, an observation point cloud extraction process 63, and a feature amount calculation process 64. In addition, the storage unit 53 includes a point cloud storage region 66 that stores information constituting the point cloud storage unit 12. The storage unit 53 further includes a feature amount storage region 67 that stores information constituting the feature amount database 20.

The CPU 51 reads out the database generation program 60 from the storage unit 53 and develops the program into the memory 52, and then, sequentially executes processes included in the database generation program 60. The CPU 51 executes the reference point extraction process 62 and thereby operates as the reference point extraction unit 14 illustrated in FIG. 1. The CPU 51 further executes the observation point cloud extraction process 63 and thereby operates as the observation point cloud extraction unit 16 illustrated in FIG. 1. The CPU 51 further executes the feature amount calculation process 64 and thereby operates as the feature amount calculation unit 18 illustrated in FIG. 1. Furthermore, the CPU 51 reads out information from the point cloud storage region 66 and develops the point cloud storage unit 12 into the memory 52. Furthermore, the CPU 51 reads information from the feature amount storage region 67 and develops the feature amount database 20 in the memory 52. This enables the computer 50 that has executed the database generation program 60 to functions as the database generation apparatus 10. Accordingly, a processor that executes the database generation program 60 being software is implemented as hardware.

The function implemented by the database generation program 60 can also be implemented by a semiconductor integrated circuit, for example, more specifically, by an application specific integrated circuit (ASIC) or the like.

Figure 13:
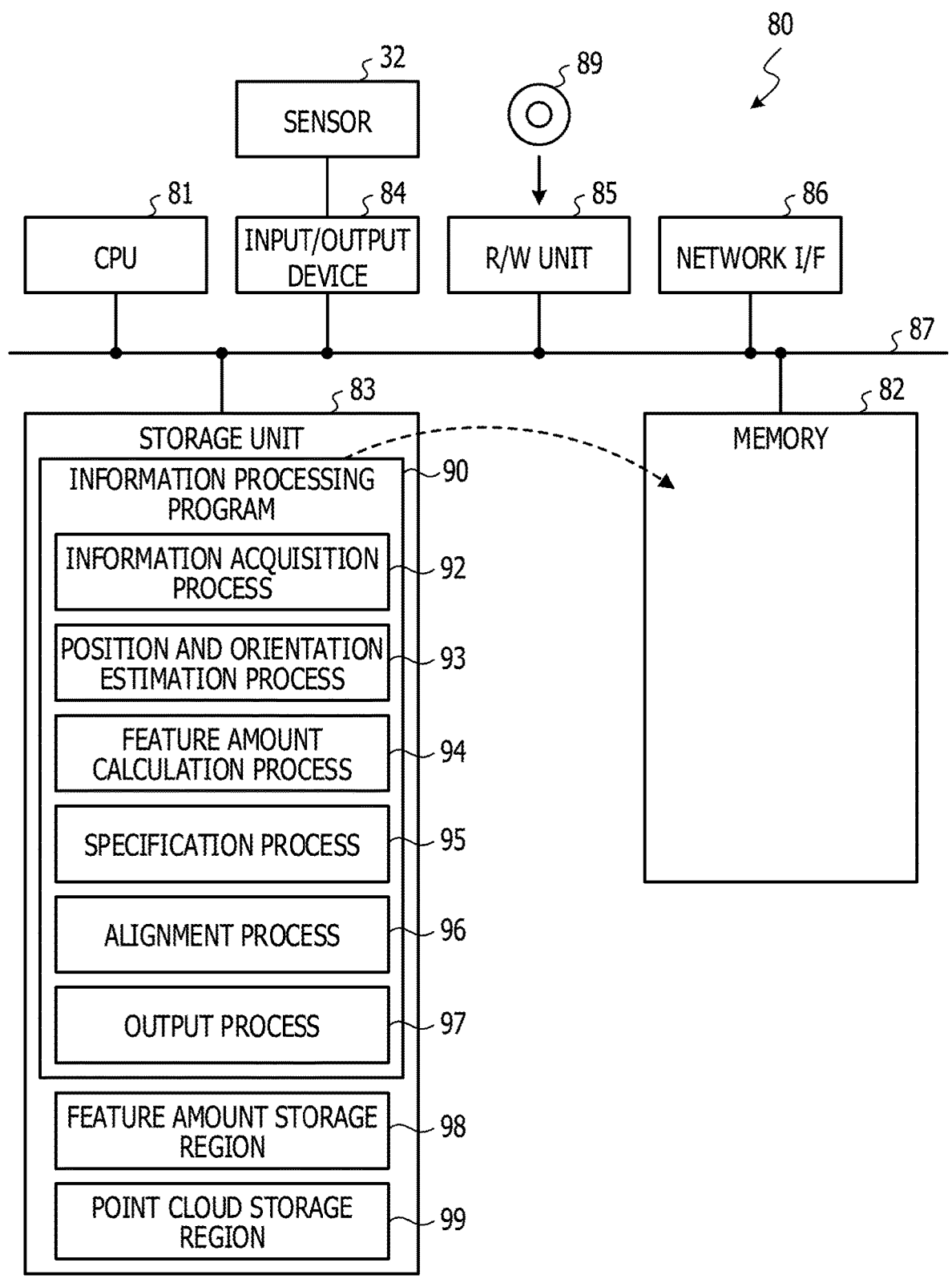
FIG. 13 is a block diagram illustrating a schematic configuration of a computer that functions as a control unit of the information processing apparatus according to the present embodiment.

The information processing apparatus 30 can be implemented by a computer 80 illustrated in FIG. 13, for example. The computer 80 includes a CPU 81, a memory 82 as a temporary storage region, and a nonvolatile storage unit 83. The computer 80 further includes: an input/output I/F 84 connected with an input/output devices (not illustrated) such as the sensor 32, display device, and an input device; and a R/W unit 85 that controls data reading and writing from and into the input/output I/F 84 and a recording medium 89. The computer 80 also includes a network I/F 86 connected to a network such as the Internet. The CPU 81, the memory 82, the storage unit 83, the input/output I/F 84, the R/W unit 85, and the network I/F 86 are interconnected via a bus 87.

The storage unit 83 can be implemented by an HDD, an SSD, a flash memory, or the like. The storage unit 83 as a storage medium stores an information processing program 90 for causing the computer 80 to function as the information processing apparatus 30. The information processing program 90 includes an information acquisition process 92, a position and orientation estimation process 93, a feature amount calculation process 94, a specification process 95, an alignment process 96, and an output process 97. The storage unit 83 includes a feature amount storage region 98 that stores information constituting the feature amount database 42. The storage unit 83 further includes a point cloud storage region 99 that stores information constituting the point cloud storage unit 45.

The CPU 81 reads out the information processing program 90 from the storage unit 83, expands the program into the memory 82, and sequentially executes the processes included in the information processing program 90. The CPU 81 executes the information acquisition process 92 and thereby operates as the information acquisition unit 36 illustrated in FIG. 9. The CPU 81 further executes the position and orientation estimation process 93 and thereby operates as the position and orientation estimation unit 38 illustrated in FIG. 9. The CPU 81 further executes the feature amount calculation process 94 and thereby operates as the feature amount calculation unit 40 illustrated in FIG. 9. The CPU 81 further executes the specification process 95 and thereby operates as the specification unit 44 illustrated in FIG. 9. The CPU 81 further executes the alignment process 96 and thereby operates as the alignment unit 46 illustrated in FIG. 9. The CPU 81 further executes the output process 97 and thereby operates as the output unit 48 illustrated in FIG. 9. Furthermore, the CPU 51 reads information from the feature amount storage region 98 and develops the feature amount database 42 into the memory 82. Furthermore, the CPU 81 reads out information from the point cloud storage region 99 and develops the point cloud storage unit 45 into the memory 82. This enables the computer 80 that has executed the information processing program 90 to function as the information processing apparatus 30. Accordingly, a processor that executes the information processing program 90 being software is implemented as hardware.

The function implemented by the information processing program 90 can also be implemented by a semiconductor integrated circuit, for example, and more specifically, by an ASIC or the like.

Figure 14:
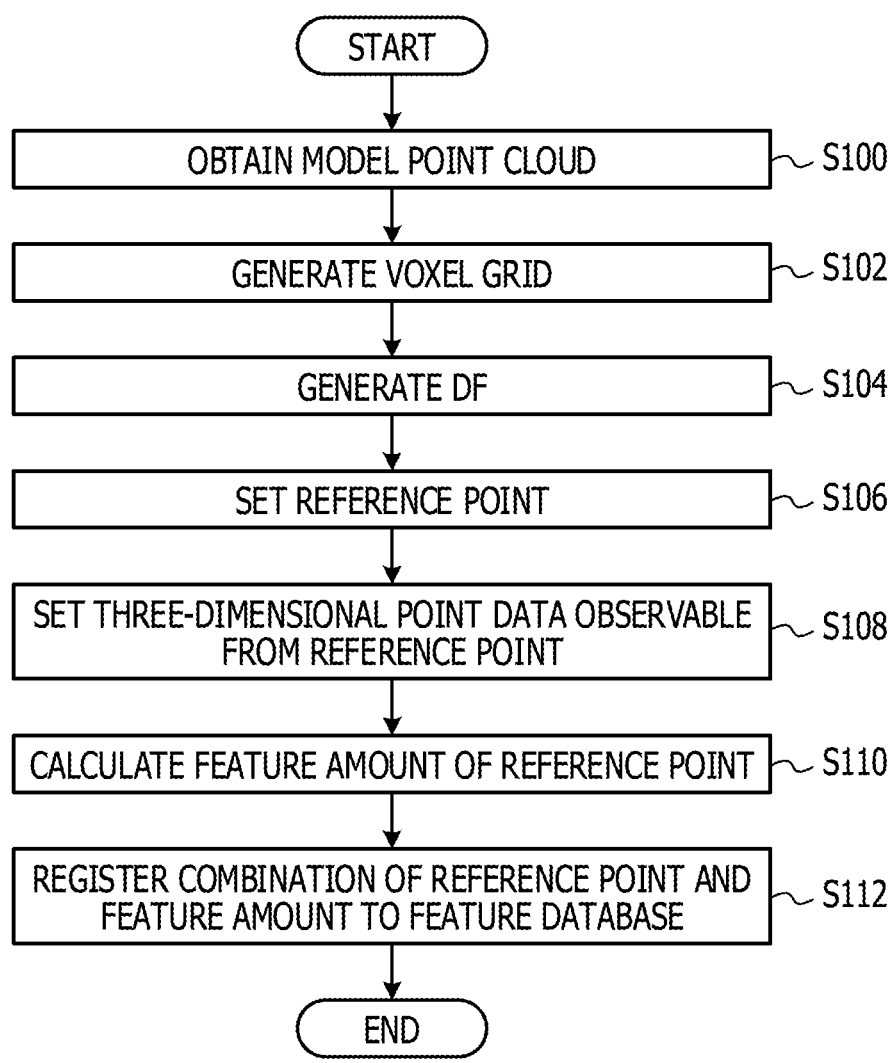
FIG. 14 is a flowchart illustrating an example of database generation processing in the present embodiment.

Next, operation of the database generation apparatus 10 according to the present embodiment will be described. In the database generation apparatus 10, a model point cloud obtained by a sensor such as LiDAR is stored in the point cloud storage unit 12, for example. Subsequently, the database generation apparatus 10 executes database generation processing illustrated in FIG. 14. The individual processing will be described in detail below.

In step S100, the reference point extraction unit 14 obtains the model point cloud stored in the point cloud storage unit 12.

In step S102, the reference point extraction unit 14 divides the three-dimensional space including the model point cloud obtained in step S100 into a predetermined number of voxels and generates a voxel grid.

In step S104, the reference point extraction unit 14 generates a DF by assigning the distance from the voxel to the three-dimensional point indicated by the nearest three-dimensional point data for each of voxels of the voxel grid generated in step S102 above.

In step S106, the reference point extraction unit 14 determines whether the value of the distance assigned to each of voxels of the DF generated in step S104 above is a local maximum in comparison with surrounding voxels. Subsequently, the reference point extraction unit 14 sets the voxel having a distance value of a predetermined threshold or more, as a reference voxel, among individual voxels to which the distance value determined to be the local maximum is assigned, on the basis of the determination result of the local maximum. Subsequently, the reference point extraction unit 14 sets the center coordinates of the reference voxel as a reference point.

In step S108, the observation point cloud extraction unit 16 extracts each of voxels observed from the reference points, for each of the reference points extracted in step S106. Subsequently, the observation point cloud extraction unit 16 sets a three-dimensional point indicated by three-dimensional point data existing inside the voxel, as a visible point cloud, for each of the extracted voxels.

In step S110, the feature amount calculation unit 18 generates a histogram for each of faces of a regular n-hedron that intersects a line-of-sight from the reference point to the visible point included in the visible point cloud set in above step S108, for each of the reference points extracted in step S106.

In step S112, the feature amount calculation unit 18 registers, to the feature amount database 20, a combination of the reference point and the histogram calculated for each of the faces of the regular n-hedron centered on the reference point, for each of reference points extracted in step S106. This completes the database generation processing.

Next, operation of the information processing apparatus 30 according to the present embodiment will be described. After the combination of the reference point and the histogram of each of faces of the regular n-hedron centered on the position of the reference point, generated for each of reference points by the database generation apparatus 10, has been input to the information processing apparatus 30, the combination is then registered to the feature amount database 42 of the information processing apparatus 30. Subsequently, in the information processing apparatus 30, the sensor 32 sequentially detects a data point cloud including a plurality of pieces of three-dimensional point data, and then, the information acquisition unit 36 sequentially obtains the data point cloud detected by the sensor 32. When the information acquisition unit 36 obtains the data point cloud, the control unit 34 of the information processing apparatus 30 executes the information processing illustrated in FIG. 15. The information processing routine is executed every time the information acquisition unit 36 obtains a data point cloud. The individual processing will be described in detail below.

In step S200, the position and orientation estimation unit 38 estimates the position of the mobile body and the orientation of the mobile body on the basis of the data point cloud obtained by the information acquisition unit 36.

In step S202, the feature amount calculation unit 40 calculates a histogram regarding each of faces of the regular n-hedron centering on the position of the mobile body on the basis of the position of the mobile body estimated in step S200 and the data point cloud obtained by the information acquisition unit 36.

Figure 16:
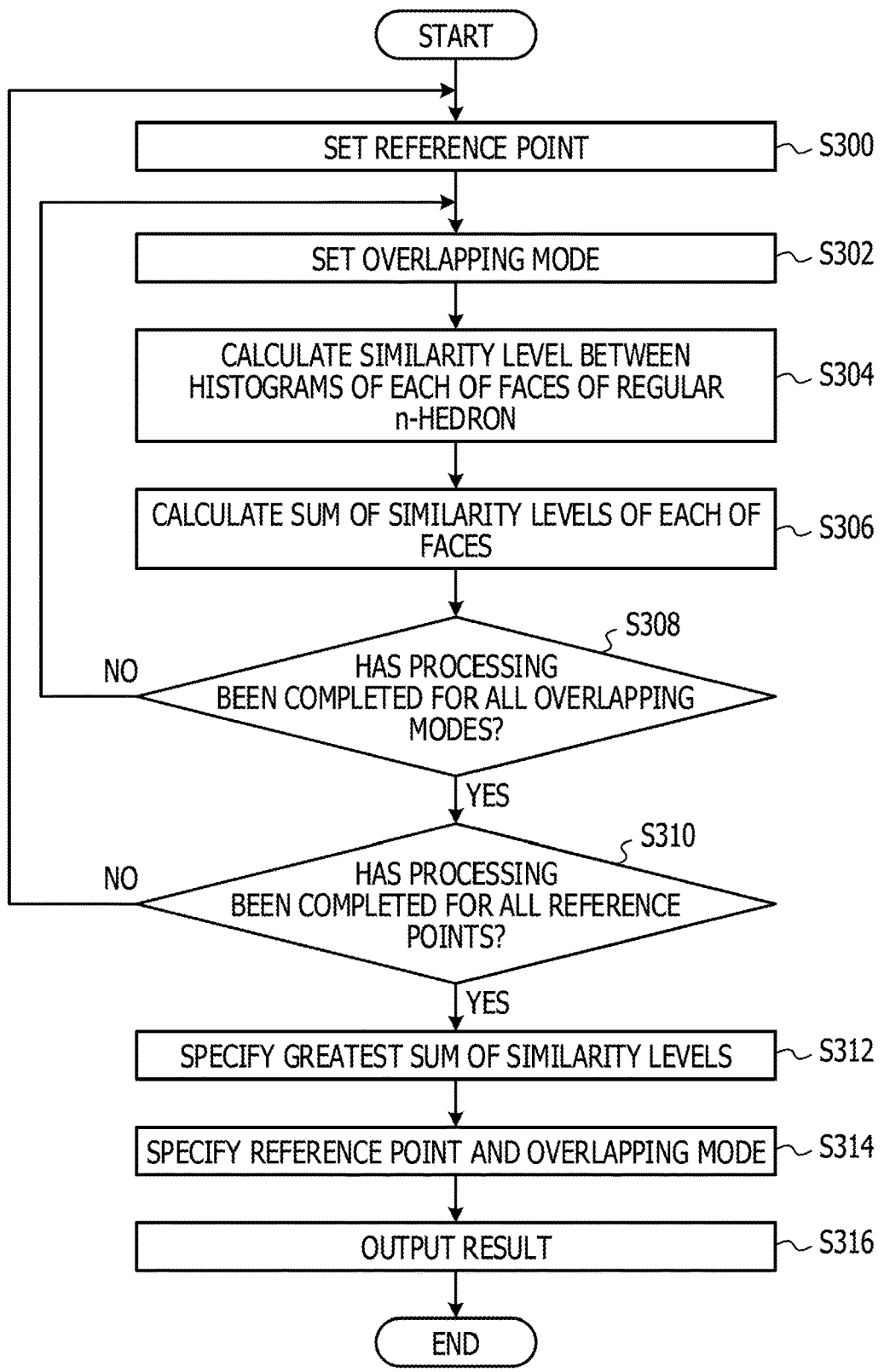
FIG. 16 is a flowchart illustrating an example of specification processing in the present embodiment.

In step S204, the specification unit 44 specifies the reference point that corresponds to the position of the mobile body from among the plurality of reference points registered in the feature amount database 42 on the basis of the histogram of each of faces of the regular n-hedron centered on the position of the mobile body, calculated in above step S202. The processing of step S204 is implemented by the specification processing routine illustrated in FIG. 16.

<Specification Processing Routine>

In step S300, the specification unit 44 sets one reference point from among each of reference points registered in the feature amount database 42.

In step S302, the specification unit 44 sets an overlapping mode between the regular n-hedron centered on the reference point set in step S300 above and the regular n-hedron centered on the position of the mobile body estimated in step S200.

In step S304, in the overlapping mode set in step S302, the specification unit 44 calculates the similarity level between the histogram of each of faces of the regular n-hedron of the reference point of the feature amount database 42 and the histogram of each of the faces of the regular n-hedron of the mobile body obtained in step S202.

In step S306, the specification unit 44 calculates the sum of the similarity levels between the histograms of each of the faces calculated in step S304 above. Subsequently, the specification unit 44 stores the sum of the similarity levels in the combination of the reference point set in step S300 and the overlapping mode set in step S302, into the storage region.

In step S308, the specification unit 44 determines whether processing of the above-described steps S302 to S306 has been executed for all the overlapping modes between the regular n-hedron centered on the reference point set in step S300 and the regular n-hedron centered on the position of the mobile body. In a case where the processing of steps S302 to S306 has been executed for all the overlapping modes, the processing proceeds to step S310. In contrast, in a case where there is an overlapping mode in which the processing of steps S302 to S306 has not been executed, the processing returns to step S302.

In step S310, the specification unit 44 determines whether the processing of step S300 to step S308 has been executed for all reference points of the feature amount database 42. In a case where the processing of steps S300 to S308 has been executed for all reference points, the processing proceeds to step S312. In contrast, in a case where there is a reference point in the feature amount database 42 which has not been subjected to execution of the processing of steps S300 to S308, the processing proceeds to step S300.

In step S312, the specification unit 44 specifies the greatest sum of the similarity levels from among the sums of the similarity levels stored in the storage region in step S306 above.

In step S314, the specification unit 44 specifies a reference point and an overlapping mode that correspond to the greatest sum of the similarity levels, on the basis of the greatest sum of the similarity levels specified in step S312.

In step S316, the specification unit 44 outputs the reference point and the overlapping mode specified in step S314, as a result.

Figure 15:
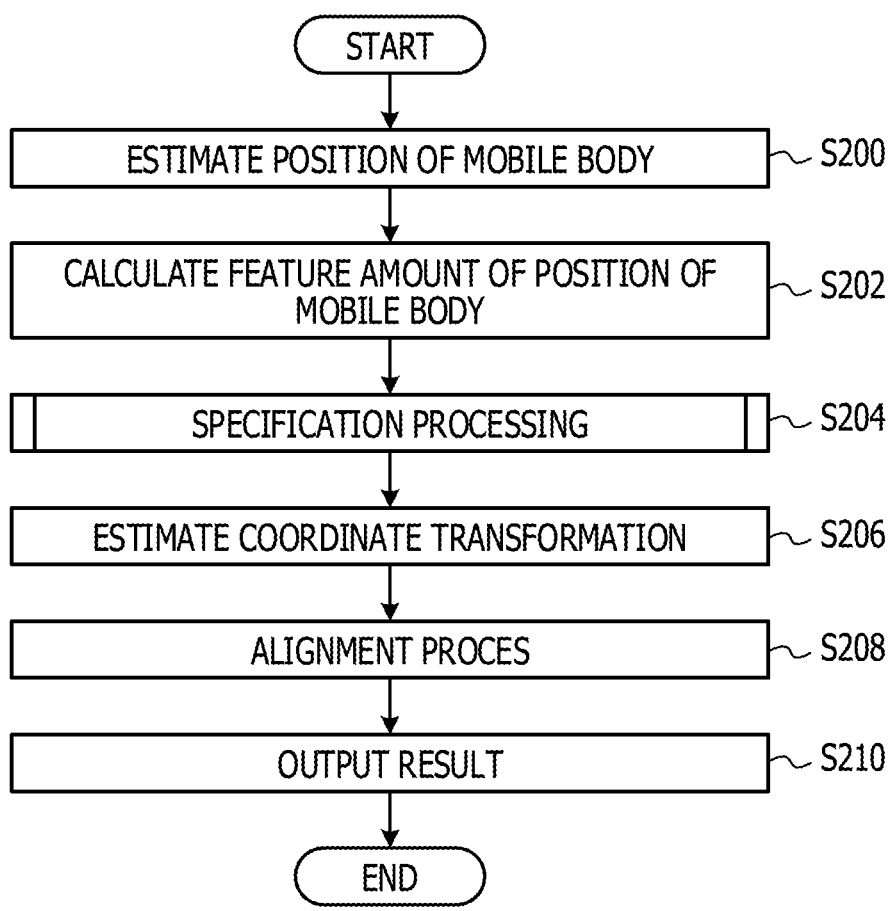
FIG. 15 is a flowchart illustrating an example of information processing in the present embodiment.

Next, in step S206 of the information processing routine of FIG. 15, the alignment unit 46 estimates coordinate transformation between the coordinate system of the position of the mobile body estimated in step S200 and the coordinate system of the model point cloud of the point cloud storage unit 45 on the basis of the reference point and the overlapping mode obtained in step S204.

In step S208, on the basis of the estimated coordinate transformation estimated in step S206 above, the alignment unit 46 uses the ICP, for example, and estimates more specific coordinate transformation so as to achieve matching between the data point cloud obtained by the information acquisition unit 36 and the model point cloud in the point cloud storage unit 45.

In step S210, the output unit 48 outputs information regarding the coordinate transformation estimated in step S208 above, as a result, and finishes the information processing routine.

As described above, the database generation apparatus according to the present embodiment extracts, for each of points in a space where the mobile body is movable, a reference point from each of points in the space where the mobile body is movable in accordance with the distance between the point and each of the three-dimensional points indicated by a plurality of pieces of three-dimensional point data observed from the point. Subsequently, the database generation apparatus calculates a feature amount according to the distance between the extracted reference point and each of the three-dimensional points indicated by the plurality of pieces of three-dimensional point data, and registers the combination of the reference point and the feature amount calculated for the reference point, to the database. With this configuration, even for pieces of three-dimensional point cloud data having different densities, it is possible to obtain reference points for associating the pieces of three-dimensional point cloud data with each other.

The information processing apparatus according to the present embodiment further calculates the feature amount according to the distance between the position of the mobile body and each of the three-dimensional points indicated by the plurality of pieces of three-dimensional point data, on the basis of the position of the mobile body and the plurality of pieces of three-dimensional point data observed by the sensor mounted on the mobile body. Subsequently, the information processing apparatus specifies the reference point that corresponds to the position of the mobile body on the basis of the database that has registered the feature amount, a plurality of combination of the reference point and the feature amount according to the distance between the position of the reference point and each of the three-dimensional points indicated by a plurality of pieces of three-dimensional point data observed from the position of the reference point. With this configuration, even for pieces of three-dimensional point cloud data having different densities, it is possible to associate the pieces of three-dimensional point cloud data with each other. For example, it is possible to estimate the position of the mobile body by associating map data being three-dimensional point cloud data having high density with three-dimensional point cloud data with low density obtained from a sensor included in the mobile body.

As described above, in a case where any of the three-dimensional points is defined as the feature point with mutually different densities of the three-dimensional point clouds, there would be a difference in the amount of information for calculating the feature amount for the feature point, making it difficult to perform association of feature points based on the calculated feature amounts. The present embodiment uses the feature amount according to the distance from the point in the space where the mobile body is movable to the observed three-dimensional point, that is, the feature amount based on the visibility from the point in the space where the mobile body is movable, instead of using the feature amount of the feature point included in the three-dimensional point cloud. This makes it possible to calculate similar feature amount that can be associated with each other for each of reference point and the position of the mobile body even in a case where there is a difference in the density of the three-dimensional point cloud, enabling association of three-dimensional point clouds with different densities, with each other.

In an aspect of the above description, the database generation program and the information processing program are preliminarily stored (installed) in the storage unit. However, the present invention is not limited to this. The program according to the disclosed technology can also be supplied in the form of being recorded on a recording medium such as a CD-ROM, a DVD-ROM, or a USB memory.

All documents, patent applications and technical standards described herein should be incorporated by reference in this specification in a same degree as in a case where each of documents, patent applications and technical standards is specifically and individually indicated to be incorporated by reference.

Next, modifications of the above embodiment will be described.

While the above embodiment has described an exemplary case where the database generation apparatus and the information processing apparatus are configured as separate devices, the database generation apparatus and the information processing apparatus may be integrated as a single device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording an information processing program that causes a computer to execute processing of:

obtaining a plurality of pieces of three-dimensional point data observed by an observation circuit mounted on a mobile body;

estimating a position and an orientation of the mobile body based on the plurality of pieces of three-dimensional point data;

calculating a first histogram regarding each of faces of a first regular n-hedron which centers on the position of the mobile body based on the position of the mobile body and the plurality of pieces of three-dimensional point data; and calculating, based on a database in which a plurality of combinations each of respective reference points in a mobile space of the mobile body and a second histogram regarding each of faces of a second regular n-hedron which centers on the respective reference points are registered, a similarity level between the first histogram and the second histogram; and specifying a reference point that corresponds to the position of the mobile body from among the plurality of reference points registered in the data base.

2. The non-transitory computer-readable recording medium according to claim 1, wherein the first histogram is related to a shape of a visible space observed from the position of the mobile body and is calculated based on the plurality of pieces of three-dimensional point data.

3. The non-transitory computer-readable recording medium according to claim 1, wherein the first histogram represents frequency of three-dimensional points present in observation directions, corresponding to each of the distances between the position of the mobile body and the three-dimensional point indicated by the three-dimensional point data, for each of the observation directions from the position of the mobile body.

4. The non-transitory computer-readable recording medium according to claim 3, wherein at the time of specification of the reference point that corresponds to the position of the mobile body, and for each of the reference points, and with respect to each of overlapping modes between the first regular n-hedron and the second regular n-hedron, obtained by rotating the first regular n-hedron, the similarity level is calculated between the first histogram in each of observation directions corresponding to each of faces of the first regular n-hedron, calculated based on the plurality of pieces of three-dimensional point data observed from the position of the mobile body, and the second histogram in each of observation directions corresponding to each of faces of the second regular n-hedron stored in the database, with the calculation performed for each of the faces, and a sum of the similarity levels calculated for each of the faces is obtained, and the reference point that corresponds to the position of the mobile body is specified based on the greatest sum of the similarity levels from among the calculated sums of the similarity levels.

5. The non-transitory computer-readable recording medium according to claim 1 wherein the processing further includes: extracting a reference point in the mobile space of the mobile body from a plurality of points in a space where the mobile body is movable in accordance with a distance between each of the points and each of the three-dimensional points indicated by the plurality of pieces of three-dimensional point data, for each of the points based on the plurality of pieces of three-dimensional point data and registering a combination of the reference point and the second histogram calculated for the reference point, into the database.

6. An information processing apparatus comprising:
a memory; and
a processor coupled to the memory and configured to execute a processing of:
obtaining a plurality of pieces of three-dimensional point data observed by an observation circuit mounted on a mobile body;

estimating a position and an orientation of the mobile body based on the plurality of pieces of three-dimensional point data;

calculating a first histogram regarding each of faces of a first regular n-hedron which centers on the position of the mobile body based on the position of the mobile body and the plurality of pieces of three-dimensional point data; and calculating, based on a database in which a plurality of combinations each of respective reference points in a mobile space of the mobile body and a second histogram regarding each of faces of a second regular n-hedron which centers on the respective reference points are registered, a similarity level between the first histogram and the second histogram which are registered in a database that registers a plurality of combinations each of the respective reference points and the feature amounts according to the distance between the position of the respective reference points and each of three-dimensional points indicated by a plurality of pieces of three-dimensional point data observed from the position of the respective reference points, based on the calculated feature amount and the database; and specifying a reference point that corresponds to the position of the mobile body from among the plurality of reference points registered in the data base.

7. The information processing apparatus according to claim 6, wherein the first histogram is related to a shape of a visible space observed from the position of the mobile body and is calculated based on the plurality of pieces of three-dimensional point data.

8. The information processing apparatus according to claim 6, wherein the first histogram represents frequency of three-dimensional points present in observation directions, corresponding to each of the distances between the position of the mobile body and the three-dimensional point indicated by the three-dimensional point data, for each of the observation directions from the position of the mobile body.

9. The information processing apparatus according to claim 8, wherein at the time of specification of the reference point that corresponds to the position of the mobile body, and for each of the reference points, and with respect to each of overlapping modes between the first regular n-hedron and the second regular n-hedron, obtained by rotating the first regular n-hedron centered on the position of the mobile body, the similarity level is calculated between the first histogram in each of observation directions corresponding to each of faces of the first regular n-hedron, calculated based on the plurality of pieces of three-dimensional point data observed from the position of the mobile body, and the second histogram in each of observation directions corresponding to each of faces of the second regular n-hedron stored in the database, with the calculation performed for each of the faces, and a sum of the similarity levels calculated for each of the faces is obtained, and the reference point that corresponds to the position of the mobile body is specified based on the greatest sum of the similarity levels from among the calculated sums of the similarity levels.

10. The information processing apparatus according to claim 6 wherein the processing further includes: extracting a reference point in the mobile space of the mobile body from a plurality of points in a space where the mobile body is movable in accordance with a distance between each of the points and each of the three-dimensional points indicated by the plurality of pieces of three-dimensional point data, for each of the points based on the plurality of pieces of three-dimensional point data and registering a combination of the reference point and the second histogram calculated for the reference point, into the database.

11. An information processing method comprising:
obtaining a plurality of pieces of three-dimensional point data observed by an observation circuit mounted on a mobile body;
estimating a position and an orientation of the mobile body based on the plurality of pieces of three-dimensional point data;
calculating a first histogram regarding each of faces of a first regular n-hedron which centers on the position of the mobile body based on the position of the mobile body and the plurality of pieces of three-dimensional point data; and
calculating, based on a database in which a plurality of combinations each of respective reference points in a mobile space of the mobile body and a second histogram regarding each of faces of a second regular n-hedron which centers on the respective reference points are registered, a similarity level between the first histogram and the second histogram which are registered in a database that registers a plurality of combinations each of the respective reference points and the feature amounts according to the distance between the position of the respective reference points and each of three-dimensional points indicated by a plurality of pieces of three-dimensional point data observed from the position of the respective reference points, based on the calculated feature amount and the database; and
specifying a reference point that corresponds to the position of the mobile body from among the plurality of reference points registered in the data base.

12. The information processing method according to claim 11, wherein the first histogram is related to a shape of a visible space observed from the position of the mobile body and is calculated based on the plurality of pieces of three-dimensional point data.

13. The information processing method according to claim 11, wherein the first histogram represents frequency of three-dimensional points present in observation directions, corresponding to each of the distances between the position of the mobile body and the three-dimensional point indicated by the three-dimensional point data, for each of the observation directions from the position of the mobile body.

14. The information processing method according to claim 13, wherein at the time of specification of the reference point that corresponds to the position of the mobile body, and for each of the reference points, and with respect to each of overlapping modes between the first regular n-hedron and the second regular n-hedron, obtained by rotating the regular n-hedron centered on the position of the mobile body, the similarity level is calculated between the first histogram in each of observation directions corresponding to each of faces of the first regular n-hedron, calculated based on the plurality of pieces of three-dimensional point data observed from the position of the mobile body, and the second histogram in each of observation directions corresponding to each of faces of the second regular n-hedron stored in the database, with the calculation performed for each of the faces, and a sum of the similarity levels calculated for each of the faces is obtained, and the reference point that corresponds to the position of the mobile body is specified based on the greatest sum of the similarity levels from among the calculated sums of the similarity levels.

15. The information processing method according to claim 11, further comprising: extracting a reference point in the mobile space of the mobile body from a plurality of points in a space where the mobile body is movable in accordance with a distance between each of the points and each of the three-dimensional points indicated by the plurality of pieces of three-dimensional point data, for each of the points based on the plurality of pieces of three-dimensional point data and registering a combination of the second histogram and the feature amount calculated for the reference point, into the database.

* * * * *